(12) United States Patent
Nakajima

(10) Patent No.: US 10,015,461 B2
(45) Date of Patent: Jul. 3, 2018

(54) DIAGNOSIS SUPPORT APPARATUS FOR LESION, IMAGE PROCESSING METHOD IN THE SAME APPARATUS, AND MEDIUM STORING PROGRAM ASSOCIATED WITH THE SAME METHOD

(71) Applicant: CASIO COMPUTER CO., LTD., Shibuya-ku, Tokyo (JP)

(72) Inventor: Mitsuyasu Nakajima, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 72 days.

(21) Appl. No.: 14/980,449

(22) Filed: Dec. 28, 2015

(65) Prior Publication Data

US 2016/0191882 A1    Jun. 30, 2016

(30) Foreign Application Priority Data

Dec. 25, 2014  (JP) ................................. 2014-261572
May 14, 2015   (JP) ................................. 2015-098708

(51) Int. Cl.
  *G06K 9/00*    (2006.01)
  *H04N 9/77*    (2006.01)
  (Continued)

(52) U.S. Cl.
  CPC ............. *H04N 9/77* (2013.01); *G06T 5/002* (2013.01); *G06T 5/009* (2013.01); *G06T 5/30* (2013.01);
  (Continued)

(58) Field of Classification Search
  CPC . G06T 7/11; G06T 2207/30101; G06T 7/155; G06T 2207/20224;
  (Continued)

(56) References Cited

U.S. PATENT DOCUMENTS

2007/0002275 A1   1/2007  Yan et al.
2008/0275315 A1   11/2008 Oka et al.
(Continued)

FOREIGN PATENT DOCUMENTS

JP          2005192944 A    7/2005

OTHER PUBLICATIONS

Fischer et al, "Analysis of Skin Lesions with Pigmented Networks", Proc. Int. Conf. Image Processing, vol. 1, 1996, pp. 323-326.*

(Continued)

*Primary Examiner* — Yon Couso
(74) *Attorney, Agent, or Firm* — Holtz, Holtz & Volek PC

(57) ABSTRACT

First extracting means of a processing unit, based on a brightness component and a color information component of a captured image separated by separating means, extract a candidate region using a first morphology processing based on the brightness component, and second extracting means of the processing unit extract a likelihood of a region from a color space composed of the brightness component and the color information component and perform a second morphology processing to generate a region-extracted image, which is displayed on the display device. In this case, the morphology processing including the smoothing filter processing is performed on an extracted candidate region and an extracted likelihood of the region.

9 Claims, 14 Drawing Sheets

(51) Int. Cl.
  *G06T 5/00* (2006.01)
  *G06T 5/30* (2006.01)
  *G06T 7/00* (2017.01)
  *G06T 5/50* (2006.01)
  *H04N 9/64* (2006.01)
  *G06T 7/11* (2017.01)
  *G06T 7/143* (2017.01)
  *G06T 7/155* (2017.01)

(52) U.S. Cl.
  CPC .............. *G06T 5/50* (2013.01); *G06T 7/0012* (2013.01); *G06T 7/11* (2017.01); *G06T 7/143* (2017.01); *G06T 7/155* (2017.01); *H04N 9/646* (2013.01); *G06T 2207/10024* (2013.01); *G06T 2207/20036* (2013.01); *G06T 2207/20208* (2013.01); *G06T 2207/20224* (2013.01); *G06T 2207/30041* (2013.01); *G06T 2207/30096* (2013.01); *G06T 2207/30101* (2013.01)

(58) Field of Classification Search
  CPC . G06T 2207/20036; G06T 5/50; G06T 5/009; G06T 7/187; G06T 5/002; G06T 5/30; G06T 7/0012; G06T 2207/10024; G06T 2207/20208; G06T 2207/30041; G06T 2207/30096; G06T 7/143; G06T 7/0081; G06T 7/0087; G06T 7/0091; H04N 9/646; H04N 9/77; A61B 6/5217
  See application file for complete search history.

(56) References Cited

U.S. PATENT DOCUMENTS

2012/0195481 A1    8/2012  Gonzalez Penedo et al.
2012/0301024 A1*  11/2012  Yuan ...................... H04N 1/624
                                                      382/167
2014/0316235 A1*  10/2014  Davis ................... A61B 5/7246
                                                      600/407

OTHER PUBLICATIONS

Extended European Search Report dated May 19, 2016, issued in counterpart European Application No. 15202420.4.
Mendiola-Santibañez, et al., "Filtering of mixed Gaussian and impulsive noise using morphological contrast detectors", IET Image Processing, vol. 8, Iss. 3, Mar. 2014, pp. 131-141.
Mendonça, et al., "Segmentation of Retinal Blood Vessels by Combining the Detection of Centerlines and Morphological Reconstruction", IEEE Transactions on Medical Imaging, vol. 25, No. 9, Sep. 1, 2006.
Quinn, et al., "Retinal Blood Vessel Segmentation using Curvelet Transform and Morphological Reconstruction", International Conference on Emerging Trends in Computing, Communication and Nanotechnology (ICE-CNN), 2013, Mar. 25, 2013, pp. 570-575.
Salembier, "Morphological multiscale segmentation for image coding", Signal Processing, Elsevier Science Publishers, vol. 38, No. 3, Aug. 1, 1994, pp. 359-386.
European Office Action dated Jul. 21, 2017 issued in counterpart European Application No. 15202420.4.

* cited by examiner

DIAGNOSIS SUPPORT APPARATUS FOR LESION, IMAGE PROCESSING METHOD IN THE SAME APPARATUS, AND MEDIUM STORING PROGRAM ASSOCIATED WITH THE SAME METHOD

CROSS-REFERENCE TO RELATED APPLICATIONS

This application claims priorities from Japanese Patent Application No. 2014-261572 filed on Dec. 25, 2014 and Japanese Patent Application No. 2015-098708 filed on May 14, 2015, which are incorporated herein by reference.

TECHNICAL FIELD

The present invention relates to a diagnosis support apparatus for a lesion, and an image processing method in the same apparatus, and a medium storing program associated with the same method.

BACKGROUND ART

Generally, visual inspection is necessarily performed to diagnose a cutaneous legion, thereby obtaining an amount of information. However, not only discrimination between a mole and a spot but also discrimination between a benign tumor and a malignant tumor are substantially difficult with a naked eye inspection and even a magnifying glass inspection. For the reasons, dermoscopic inspection in which a dermoscope-equipped camera is used to capture an image of a disease has been conventionally performed.

The dermascope is a noninvasive diagnostic device in which a disease irradiated with light from, for example, a halogen lamp, and unobstructed by reflective light due to echo gel or a polarization filter is magnified (typically ×10) and subjected to observation. A dermoscopic diagnosis can be defined as the inspection of skin diseases with the dermoscope. For more detail, see internet URL (http://www.twmu.ac.jp/DNH/department/dermatology/dermoscopy.html) (accessed on Sep. 1, 2014). In accordance with the dermoscopic diagnosis, scattered reflection occurring due to a cuticle is eliminated, thereby rendering the distribution of pigmentation from an epidermis to a superficial intradermal layer increasingly visible.

For example, Patent Literature 1 (Japanese patent publication No. 2005-192944 (A)) discloses technologies of a remote diagnosis apparatus of diagnosing a pigmented skin disease employing a value such as color, a texture, an asymmetricity, and a circularity based on an image of a skin captured by the dermoscope. In accordance with Patent Literature 1, a portable phone provided with a dermoscope-equipped camera is used, and an image of a skin having a disease of a benign nevus pigmentosus and etc. and having a risk of a melanoma is captured by the dermoscope. The portable phone is connected to an internet due to its network connecting function, and the image of the skin captured is transmitted via the internet to the remote diagnosis apparatus to request a diagnosis. Upon receiving the image of the skin based on the request, the remote diagnosis apparatus uses a melanoma diagnosis program to determine whether based on the image of the skin the disease is a melanoma or not, or in a case where the disease is the melanoma, which stage of the melanoma is. The determination as a result is transmitted to a physician having requested the diagnosis.

While diagnosis based on the afore-mentioned dermoscopic image has become widely used in the field of cutaneous disease, clear shape change or pattern is often difficult to obtain. In addition, an observation of the image and a determination of a lesion actually depend on a skill of a physician or clinician. While an algorism for performing a top-hat morphology processing to clearly extract a linear vessel or punctate vessel can be considered, when applied to a vessel with an irregular image gradient it results in a false pattern such as a moire, thereby deteriorating the accuracy of diagnosis.

CITATION LIST

Patent Literature

[Patent Literature 1] Japanese patent publication No. 2005-192944 (A)

SUMMARY OF INVENTION

In order to overcome the afore-mentioned drawbacks or problems, in accordance with a first aspect of the invention, there is provided a diagnosis support apparatus of diagnosing a lesion based on a captured image, comprising: a processing unit configured to process the captured image composed of multivalued image as an original image; and an image-memorizing unit configured to memorize the original image, wherein the processing unit performs: a first generation processing of performing a bottom-hat closing processing in a morphology processing for detecting a dark portion based on the original image memorized in the image-memorazing unit, to generate an image (A); a second generation processing of performing a top-hat opening processing in a morphology processing for detecting a bright portion based on the original image, to generate an image (B); a first extraction processing of performing a smoothing filter processing on the image (A) and subtracting the image (A) from a smoothing filter-processed image (A) to extract a candidate region, when acquiring a shape from a low pixel value of the original image; and a second extraction processing of performing a smoothing filter processing on the image (B) and subtracting a smoothing filter-processed image (B) from the image (B) to extract a likelihood of a region, when acquiring a shape from a high pixel value of the original image.

In accordance with a second aspect of the invention, there is provided with a diagnosis support apparatus of diagnosing a lesion based on a captured image of an affected area, comprising: an image-memorizing unit configured to memorize the captured image, and a processing unit configured to process the captured image memorized in the image-memorizing unit, the processing unit performs: a separation processing of separating the captured image into a brightness component and a color information component, and an extraction processing of extracting a region to be diagnosed, the extracting means comprising at least a first extraction processing of extracting a candidate region based on the brightness and a second extraction processing of extracting a likelihood of a region based on the color information component, and performing a morphology processing comprising a smoothing filter processing on an extracted candidate region or an extracted likelihood of the region. Other aspects or features become apparent in view of the specification and drawings attached hereto.

DESCRIPTION OF EMBODIMENTS

Figure 1:
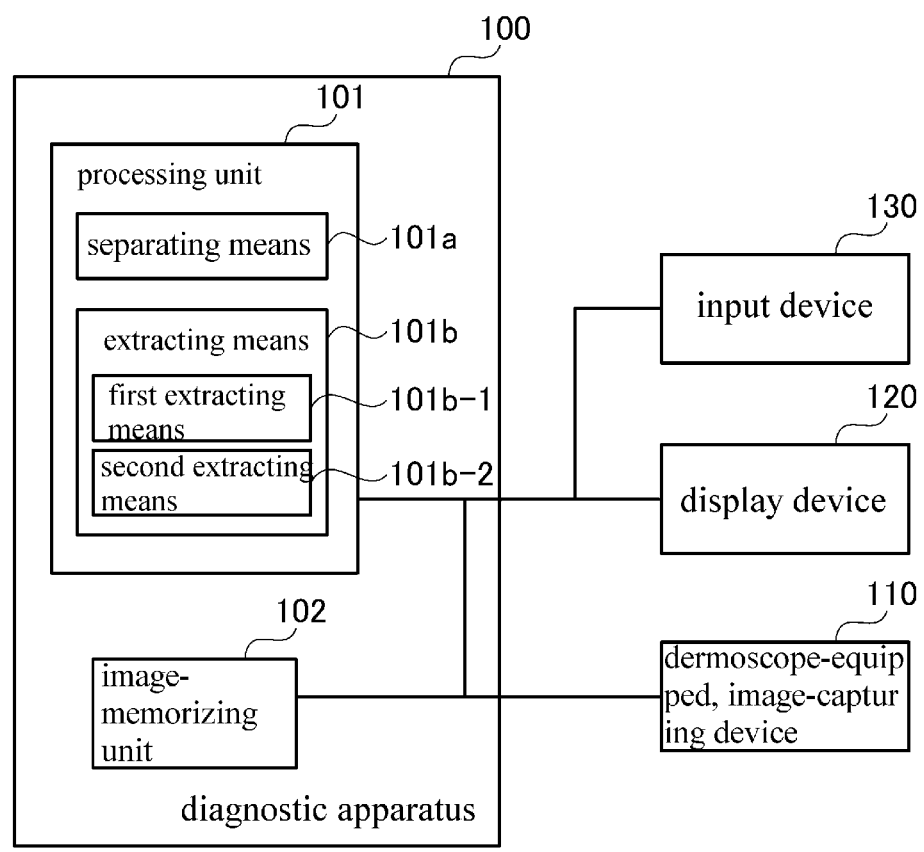
FIG. 1 is a block diagram showing a configuration of a first embodiment of a diagnosis support apparatus in accordance with the invention.

Referring to the accompanying drawings, an embodiment of the invention will be hereinafter described in detail. Furthermore, the same reference numeral is assigned to the same element or part throughout the overall specification.

First Embodiment

Configuration of First Embodiment

FIG. 1 is a block diagram showing a configuration of a diagnosis support apparatus 100, a first embodiment of the diagnosis support apparatus in accordance with the invention. Referring to FIG. 1, an image-capturing device 110 equipped with a dermoscope, which can be hereinafter designated as an "image-capturing device 110" or "dermoscope-equipped, image-capturing device 110" throughout the specification, is connected to the diagnosis support apparatus 100. The dermoscope-equipped, image-capturing device 110 is configured to capture an image (i.e., a dermoscopic image or an original image) of an affected area in accordance with an instruction from the diagnostic support apparatus 100 (in particular, a processing unit 101), memo- rize the captured image in an image-memorizing unit 102, and display the captured image on a predetermined area of a display device 120. Furthermore, the captured image is highlighted by the processing unit 101, and then memorized in the image-memorizing unit 102 and displayed on the predetermined area of the display device 120. An input device 130 is configured to perform an instruction for starting to capture an image such as a dermoscopic image, and selection of a region in the dermoscopic image, which will be described below.

The display device 120 may be a LCD (Liquid Crystal Display) monitor, and the input device 130 may be a mouse.

The processing unit 101 is configured to process the captured image as memorized in the image-memorizing unit 102, and has a separating means 101a and an extracting means 101b. The processing unit 101 may further have a clarifying means 101c and an embodiment where the processing unit 101 is provided with the clarifying means 101c is described below as a third embodiment.

The separating means 101a function as a means of separating the captured image into a brightness component and a color information component.

The extracting means 101b function as a means of extracting a region to be diagnosed, and has at least one of a first extracting means 101b-1 of extracting a candidate region based on the brightness component, and a second extracting means 101b-2 of extracting a likelihood of region based on a color space composed of the brightness component and the color information component. The extracting means 101b perform a morphology processing including a smoothing filter processing on the candidate region or the likelihood of the region as extracted.

In a case where the extracting means 101b extract a shape indicating the candidate region or the likelihood of the region out of structuring elements in the captured image, the first extracting means 101b-1 may perform a first morphology processing using the brightness component to extract the candidate region, and the second extracting means 101b-2 may extract the likelihood of the region using the color space. The extracting means 101b may combine an extracted candidate region with an extracted likelihood of the region to generate an extracted image.

In a case where the extracting means 101b extract a shape indicating the candidate region or the likelihood of the region out of structuring elements in the captured image, the second extracting means 102b-2 may extract the likelihood of the region using the color space, and the extracting means 101b may perform a second morphology processing using an extracted likelihood of the region to generate a region-extracted image.

In this regard, the first morphology processing includes a closing where a dilation and an erosion are repeatedly performed on the extracted brightness component in this order, a smoothing filter processing that is performed on the closing-processed brightness component, and a subtracting processing of subtracting the brightness component of the captured image from the smoothing filter-processed brightness component. The second morphology processing includes an opening where the erosion and the dilation are repeatedly performed on the extracted likelihood of the region in this order, a smoothing filter processing that is performed on the opening-processed likelihood of the region, and a subtracting processing of subtracting the smoothing filter-processed likelihood of the region from the extracted likelihood of the region. Furthermore, an image that is obtained as a result of the closing is defined by "image A"; a processing unit by which the image A is prepared is defined by a "first processing module"; an image that is obtained as a result of the opening is defined by "image B"; and a processing module by which the image B is prepared is defined by a "second processing unit".

Each of the separating means 101a and the extracting means 101b (i.e., the first extracting means 101b-1 and the second extracting means 101b-2) as described above can execute the afore-mentioned original function thereof by the processing unit 101's sequentially reading a program in accordance with the first embodiment of the invention, owned by the processing unit 101.

Operation of First Embodiment

The operation (i.e., image processing method) of the diagnosis support apparatus 100 in accordance with the first embodiment as shown in FIG. 1 is described in detail with reference to FIG. 2 and below. The operation of the diagnosis support apparatus 100 as described below can be done by causing a computer to execute each corresponding function. The same logic will be applied to a second embodiment and a third embodiment which will be described below.

Figure 2:
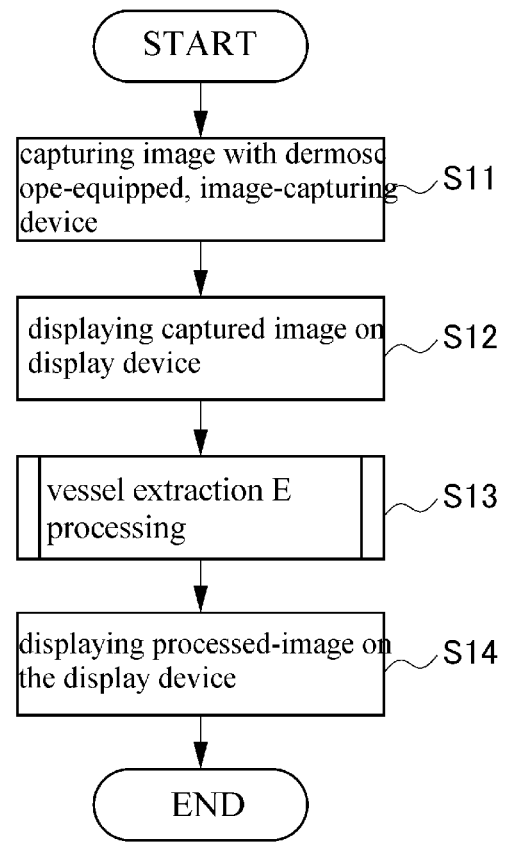
FIG. 2 is a flow chart illustrating a basic processing operation of the first embodiment of the diagnosis apparatus in accordance with the invention.

FIG. 2 depicts the flow of basic processing operation of the diagnosis support apparatus 100 in accordance with the first embodiment of the invention. Referring to FIG. 2, the processing unit 101 firstly acquires an image of an affected area (i.e., a cutaneous lesion) that is captured by the dermoscope-equipped, image-capturing device 110 (Step S11). Then, the captured image as acquired is memorized in the predetermined area of the image-memorizing unit 102, and is displayed on the display device 120 (Step S12). Subsequently, the processing unit 101 performs vessel extraction E processing on the captured image (Step S13), performs highlighting processing on the extracted vessel, and displays the processed image and the captured image as previously displayed in parallel on the display device 120. Diagnosis is left to a physician (Step S14).

Figure 9:
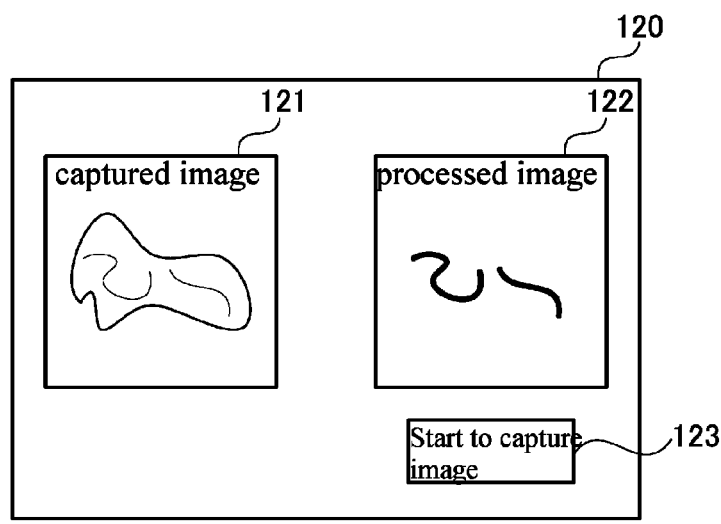
FIG. 9 shows an exemplary display screen configuration of the first embodiment of the diagnosis support apparatus in accordance with the invention.

An exemplary image of a display screen displayed on the display device 120 is shown in FIG. 9. In the screen of FIG. 9, a captured image-displaying section 121 in which the captured image is displayed is arranged at a left side and a highlighted image-displaying section 122 in which the highlighted image of vessel is shown is arranged at a right side. For example, upon the physician's clicking a button of "start to capture image" 123 which is located at a bottom right of the screen of the display device 120 with the input device 130, the dermoscope-equipped, image-capturing device 110 starts to capture the image of the affected area. Due to the vessel extraction processing performed by the processing unit 101, the captured image and the highlighted image of the vessel extracted out of the captured image are respectively displayed in the sections 121 and 122 arranged in parallel.

Figure 3:
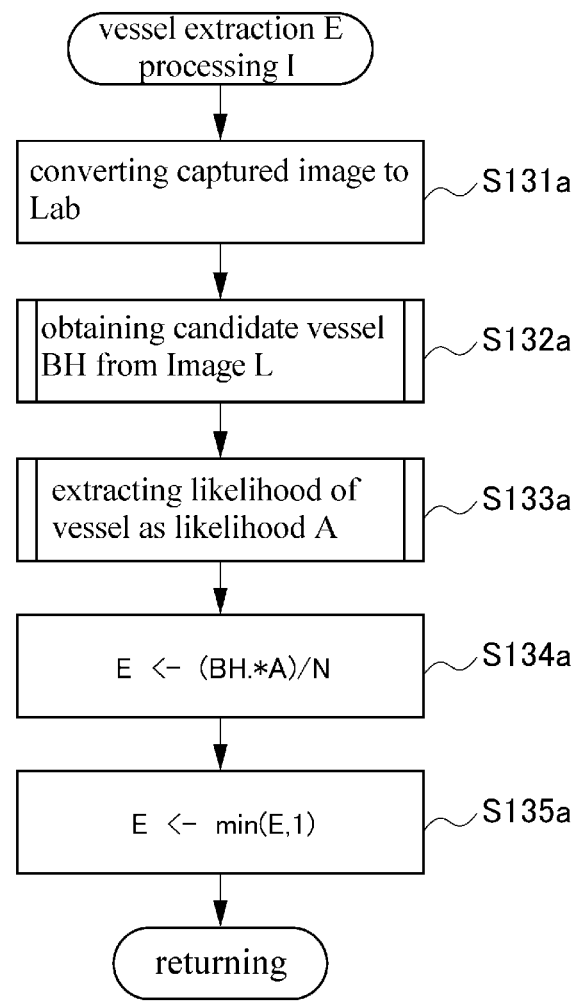
FIG. 3 is a flow chart illustrating an exemplary vessel extraction E processing of FIG. 2.

The details of the vessel extraction E processing as defined in Step S13 of FIG. 2 are shown in FIG. 3. Referring to FIG. 3, the separating means 101a of the processing unit 101 firstly convert the captured image from RGB color space to Lab color space (CIE 1976 L*a*b* color space) (Step S131a). The details of the Lab color space are described in, for example, internet URL (http://Ja.wikipedia.org/wiki/Lab%E8%89%B2%E7%A9%BA%E9%96%93) (accessed on Sep. 1, 2014). Hereinafter, L, a and b of coordinate axes in the Lab color space are written in bold italics.

Next, the extracting means 101b of the processing unit 101 extract the region selected as the object to be diagnosed. Specifically, the first extracting means 101b-1 extract the candidate for the selected region (i.e., a candidate vessel) from the separated brightness component in the Lab color space. To this end, the first extracting means 101b-1 perform the morphology processing A (i.e., the first morphology processing) on an image L corresponding to the brightness in the Lab color space that is obtained as a result of color space conversion that is performed by the separating means 101a to generate a candidate vessel image BH (Step S132a). In this regard, as the morphology processing is performed by applying structuring element(s) to an input image to generate the candidate vessel image BH as an output image having the same size as the input image, each value of the output image is based on comparison between the corresponding pixel and neighboring pixel(s) within the input image.

Most basic morphology processing is represented by dilation and erosion. The dilation is performed by adding a pixel to the boundary of the object within the input image, and the erosion is performed by removing a pixel from the boundary of the object. The number of the pixel(s) added to or removed from the object depends on a size and a shape of the structuring element used in the image processing.

In this case, a process of how the morphology processing A is performed and the region selected as the object to be diagnosed (i.e., the candidate vessel) is extracted from the brightness component will be described. The detailed procedure of bottom-hat processing is illustrated in FIG. 4.

Figure 4:
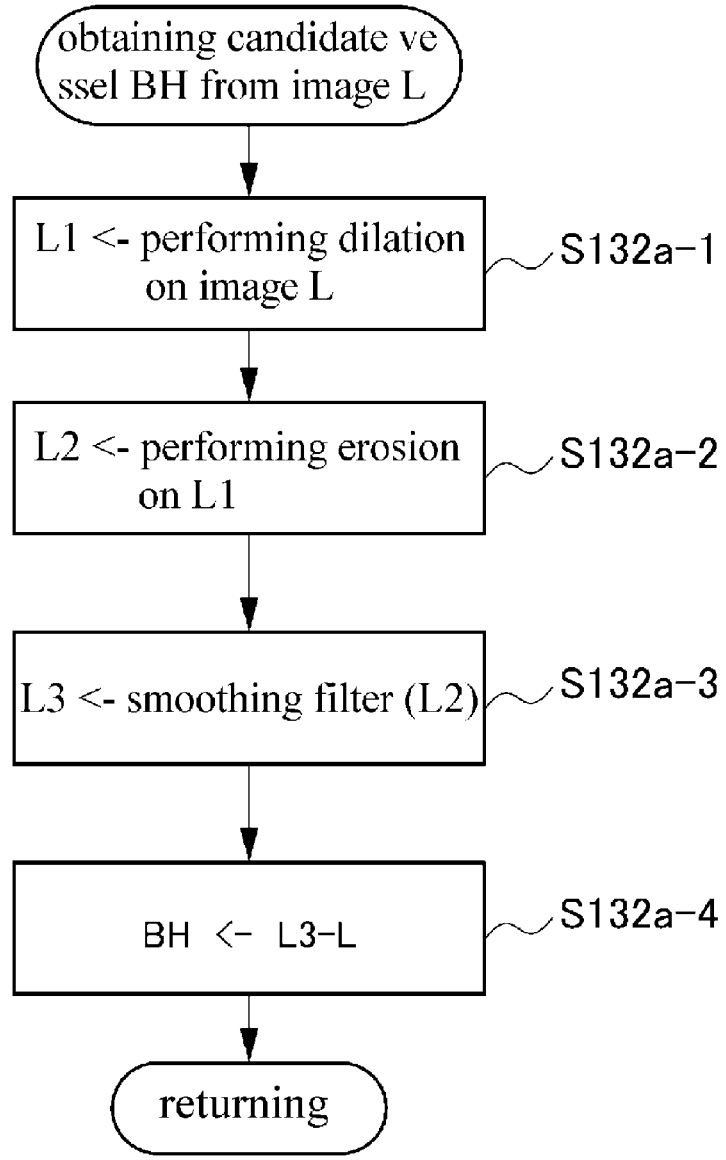
FIG. 4 is a flow chart illustrating an exemplary processing of obtaining a candidate vessel image from a brightness image of FIG. 3

Referring to FIG. 4, the first extracting means 101b-1 perform the dilation on the image L to obtain a processed brightness image L1 (Step S132-1). The details of the dilation are described in, for example, internet URL (http://www.mathworks.co.jp/jp/help/images/morphology-fundamentals-dilation-and-erosion.html) (accessed on Sep. 1, 2014)

Next, the first extracting means 101b-1 perform the erosion on the dilation-processed brightness image L1 to obtain an erosion-processed brightness image L2 (Step S132a-2). Subsequently, the first extracting means 101b-1 perform a smoothing filter processing on the erosion-processed brightness image L2 to obtain a smoothed brightness image L3 in which the brightness is smoothed (Step S132a-3). In this smoothing filter processing, Gaussian filter is used.

Smoothing using the Gaussian filter is represented by the following arithmetic equation:

$$f(x,y)=(1/(2\pi\sigma^2))\exp(-(x^2+y^2)/(2\sigma^2))$$

In the Gaussian filter, weighting due to Gaussian distribution is used as the predetermined route. The degree of smoothing can be controlled by the size of σ in the above arithmetic equation and realized by setting the predetermined value. Furthermore, the smoothing filter is not limited to the Gaussian filter, and other filters such as a median filter and a mean filter may be used. The bottom-hat processed image BH is obtained by subtracting the image L from the smoothed brightness image L3 (BH=L3−L) (Step S132a-4).

The afore-mentioned processing is repeated predetermined times. When the predetermined times are completed, the image BH as thus obtained is a vessel-extracted image E. If the number of times does not reach the predetermined times, the processing such as the dilation (Step S132a-1) and the erosion (Step S132a-2) is repeatedly performed on the image BH as the image L.

The dilation is further explained. For example, the structuring element having a diameter of five dots is considered. The dilation means that the processing in which a maximum value of a notice pixel within the range of the structuring element(s) becomes a value of the notice pixel is performed on all the pixels. In other words, an output value of the notice pixel corresponds to the maximum value of all the pixels neighboring the input pixel. On the other hand, the erosion means that the processing in which a minimum value of a notice pixel within the range of the structuring element becomes a value of the notice pixel. In other words, the value of the notice pixel corresponds to the minimum value of all the pixels neighboring the input pixel. While the structuring element is a circular in this embodiment, it may be rectangular. However, the circular structuring element can lessen the degree of smoothing of the smoothing filter.

Returning to FIG. 3, the second extracting means 101b-2 of the processing unit 101 extract the likelihood of the selected region (i.e., the likelihood of vessel) based on the color space composed of the brightness component and the color information component. To this end, the second extracting means 101b-2 calculate the likelihood of vessel as the likelihood A (Step S133a). The likelihood A may be determined in accordance with, for example, the flow chart of FIG. 5.

Figure 5:
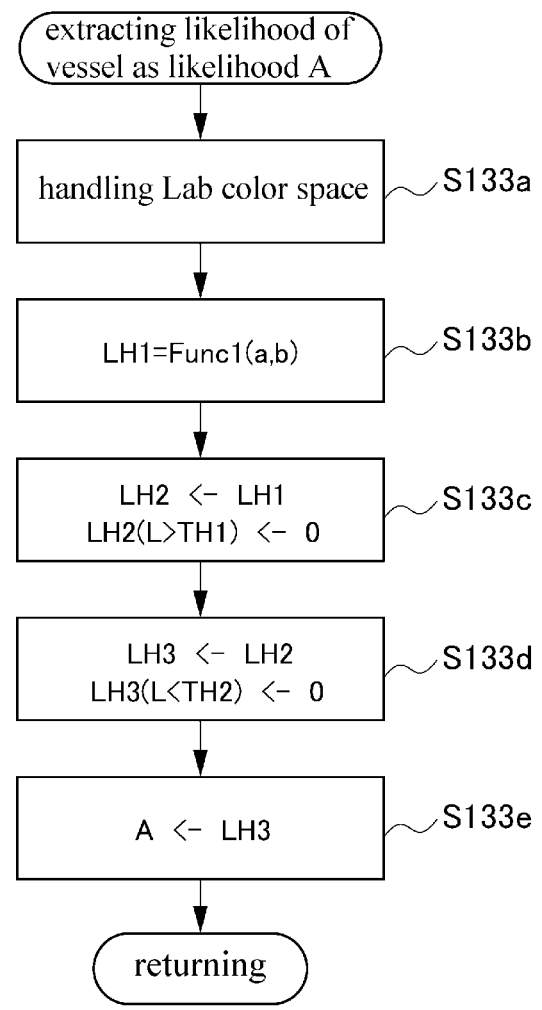
FIG. 5 is a flow chart illustrating an exemplary processing operation of extracting a likelihood of vessel as a likelihood A as defined in FIG. 3.

Referring to FIG. 5, the second extracting means 101b-2 of the processing unit 101 perform an extraction using the value of an a axis that is the color information component corresponding to a direction of red-based color in the color space and the value of a b axis that is the color information component corresponding to a direction of blue-based color in the color space. In other words, the second extracting means 101b-2 perform the following operation using the value of a axis and the value of b axis of the Lab color space to generate LH1 (Step S133b).

$$ad = (a-ca)*\cos(r) + b*\sin(r) + ca$$

$$bd = -(a-ca)*\sin(r) + b*\cos(r)$$

$$LH1 = \exp(-((ad*ad)/sa/sa + (bd*bd)/sb/sb))$$

In the above operation, "ad" and "bd" are obtained by rotating an ab plane in an extent of r radian(s) in a counterclockwise direction around (ca, 0). In this regard, the value of "r" may be within the range from 0.3 radian to 0.8 radian. The value of "ca" may be within the range from 0 to 50. The "sa" and "sb" are a reciprocal of the sensitivity in the a axis direction and a reciprocal of the sensitivity in the b axis direction, respectively. In this embodiment, "sa" is greater than "sb". Furthermore, in the above operation, "*" means multiplication between elements of a matrix.

Next, the second extracting means 101b-2 put a restriction on the resulting LH1 with the brightness L. If the brightness L is a threshold TH1 or above, LH1 (L=0) becomes LH2 (Step S133c). If the brightness L is the threshold TH2 or below, the LH2 becomes LH3 (Step S133d). The threshold TH1 is a value of range from 60 to 100, and the threshold TH2 is a value of range from 0 to 40. The LH3 as thus obtained becomes the likelihood A indicating the likelihood of vessel (Step S133e).

Returning to FIG. 3, after extracting the likelihood of vessel as the likelihood A in accordance with the aforementioned procedure (Step S133a), the second extracting means 101b-2 multiply the bottom-hat processed image BH by each element of the likelihood A indicating the likelihood of vessel, and divide the result by a coefficient N (Step S134a). Further, the highlighted, vessel-extracted image E is generated by clipping with 1 (Step S135a).

In accordance with the embodiment, the vessel-extracted image E is a multivalued image having a value of the range from 0 to 1. However, as the vessel-extracted image E has been subjected to the bottom-hat processing, the boundary of the extracted vessel becomes steep. If the steeper boundary is desired, binarization with a desired threshold may be performed.

As described previously, the second extracting means 101b-2 calculates the likelihood A indicating the likelihood of vessel of the selected region by rotating plane coordinates which are composed of the red-based color direction and the blue-based color direction of the color space in an extent of predetermined angle in a counterclockwise direction about a predetermined point on the axis of the red-based color direction, and putting a restriction on the brightness component with the predetermined range of the value. The selected region is highlighted by multiplying the brightness image that is obtained by performing the bottom hat processing on the image of the brightness component by the likelihood A as calculated.

Figure 6:
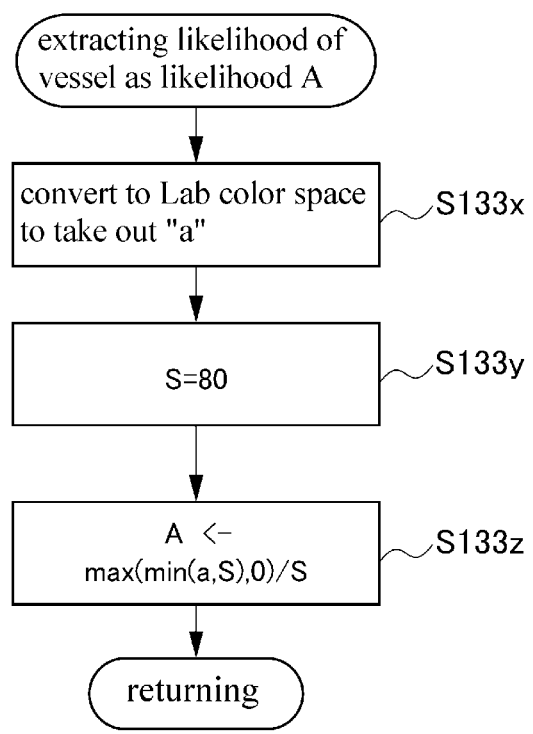
FIG. 6 is a flow chart illustrating another exemplary processing operation of extracting a likelihood of vessel as a likelihood A as defined in FIG. 3.

A modified embodiment that the likelihood of vessel is extracted as the likelihood A is described with reference to the flow chart of FIG. 6. The extracting means acquire the value of an a axis that corresponds to a direction of red-based color in Lab color space (Step S133x), and set the value of the likelihood of vessel (i.e., the likelihood A) within the range of from 0 to 1 via normalization (A←max (min(a, S), 0)/S) with the limited range of from 0 to 80 (Step S133z). In this embodiment, the value of likelihood A is subjected to limitation of the value of from 0 to 80 by applying, for example, 80 to S (Step S133y). However, the above value is only non-restrictive example.

Figure 7:
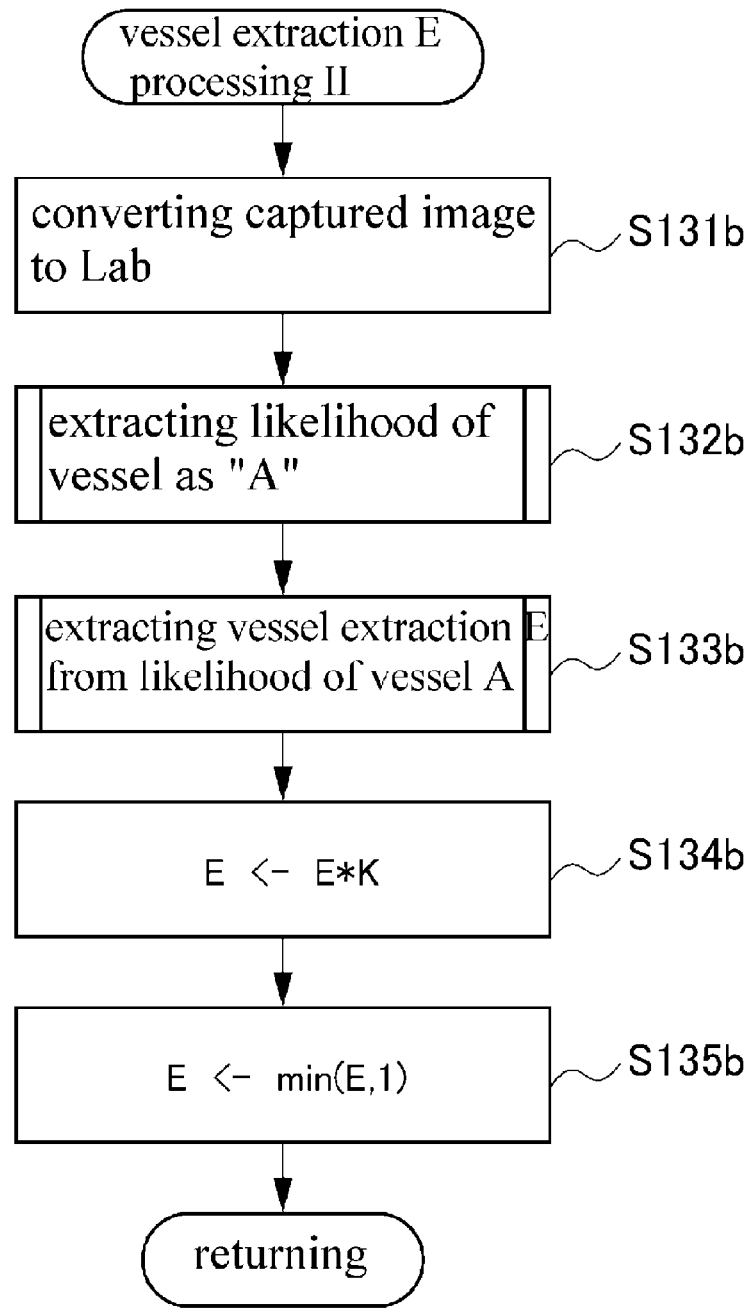
FIG. 7 is a flow chart illustrating another exemplary vessel extraction E processing of FIG. 2.

Next, a method for directly extracting the vessel from the color information is described with reference to the flowchart of FIGS. 7 and 8. In the following description, an image of the likelihood of vessel is generated from the color information, and the vessel is extracted due to an improved top-hat processing that is also referred to as a "morphology processing B". Furthermore, in the image of the likelihood of vessel greater likelihood means greater value of the image.

In the morphology processing A as shown in FIG. 4 the dilation is performed on a source image, and then the erosion is performed the image as thus obtained. The processing in which the dilation and the erosion are repeatedly performed the same times is referred to as closing. In other words, with the diagnosis support apparatus 100 in accordance with the first embodiment of the invention, the smoothing filter processing is performed on the closing-processed image, and the image as thus obtained is subtracted from the source image (i.e., black-hat processing). In this regard, the source image is the brightness image L, and the value of the image in the vessel is made relatively low. As such, when a shape the value of which is low in the image is intended to extract, the morphology processing A as shown in FIG. 4 is used.

The vessel extraction E processing II using the morphology B is hereinafter described. Referring to FIG. 7, the separating means 101a of the processing unit 101 firstly convert the captured image from RGB color space into the Lab color space (Step S131b). Next, the second extracting means 101b-2 of the processing unit 101 extract the likelihood of the selected region (i.e., the likelihood of vessel) based on the separated color information component in the Lab color space. To this end, the second extracting means 101b-2 calculate the likelihood of vessel as the likelihood A (Step S132b). The likelihood A can be determined as described above in connection with FIGS. 5 and 6.

Subsequently, the second extracting means 101-b acquire the vessel-extracted image E from the image A indicating the likelihood of vessel (i.e., the image A of the likelihood of vessel) (Step S133b). The procedure of acquiring the vessel-extracted image E from the image A of the likelihood of vessel (i.e., the likelihood of vessel image A) is shown in FIG. 8.

Figure 8:
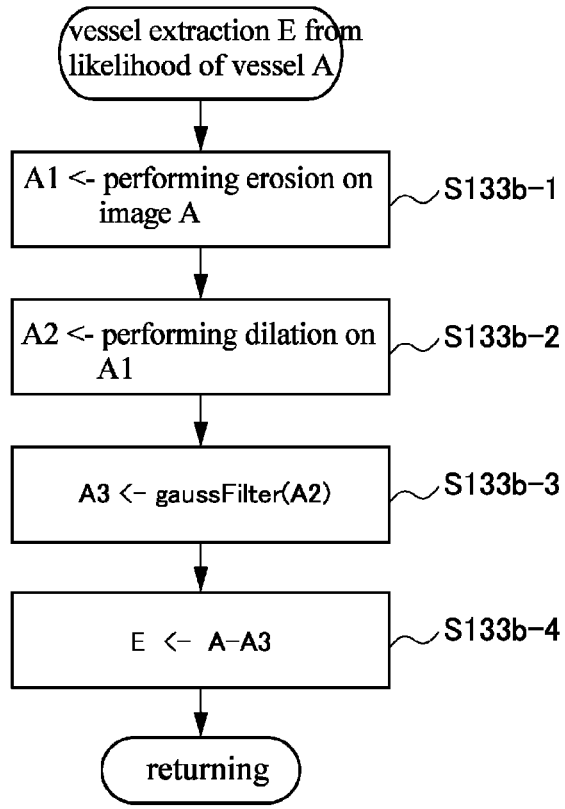
FIG. 8 is a flow chart illustrating a processing operation of performing vessel extraction E based on the likelihood of vessel of FIG. 7.

Referring to FIG. 8, the second extracting means 101b-2 cause proper structuring element(s) to perform erosion processing on the image A of the likelihood of vessel to obtain the erosion-processed image A1 of the likelihood of vessel (Step S133b-1). Next, the erosion-processed image A1 of the likelihood of vessel is subjected to dilation processing to obtain a dilation-processed image A2 of the likelihood of vessel (Step S133b-2). The second extracting means 101b-2 further perform the smoothing filter processing (i.e., Gaussian filtering) on the image A2 of the likelihood of vessel having undergone the dilation processing to obtain smoothing-processed image A3 of the likelihood of vessel (Step S133b-3). Ultimately, the smoothing-processed image A3 of the likelihood of vessel is subtracted from the image A of the likelihood of vessel to obtain the vessel-extracted image E (Step S133b-4).

As described previously, the erosion is performed on the source image (i.e., the image A of the likelihood of vessel) and then the dilation is performed on the image as thus obtained to obtain the opening-processed image. The second extracting means 101b-2 perform on the smoothing filter processing on the opening-processed image, and subtract the opening-processed image from the source image (i.e., the top-hat processing), thereby extracting the shape of the vessel out of the source image. In this regard, as the source image is the image of likelihood of vessel, the value of the image looking like the vessel is made high.

Returning to FIG. 7, after obtaining the vessel-extracted image E from the image A of the likelihood of vessel, the second extracting means 101b-2 multiply the vessel-extracted image E by proper coefficient N (Step S134b), and perform clipping processing with 1 to generate a highlighted, vessel-extracted image E (Step S135b).

As described previously, as the diagnosis support apparatus 100 in accordance with the first embodiment of the invention achieves the shape from the multivalued images, in the case of achieving a shape, the value of which is high in the image, it performs smoothing filter processing on the closing-processed image and subtracts the source image from the image as thus obtained to obtain the vessel-extracted image E. On the other hand, in the case of obtaining a shape, the value of which is low in the image, the diagnosis support apparatus 100 in accordance with the first embodiment of the invention performs the smoothing filter processing on the opening-processed image and subtracts the image as thus obtained from the source image to obtain the vessel-extracted image E. In this regard, the opening processing is defined by a processing in which the erosion and the dilation are performed once or multiple times in this order, and the closing processing is defined by a processing in which the dilation and the erosion are performed once or multiple times in this order. In both of the opening processing and the opening processing, the shape of the structuring element used is preferably circular. The smoothing filter which can be employed in the embodiment includes, but not limited to, a Gaussian filter, a mean filter, a median filter, and etc.

The afore-mentioned diagnosis support apparatus 100 can be used in order to acquire the shape with the thermoscope. In this case, the vessel shape is extracted from the brightness image and/or the image of the likelihood of the vessel, thereby allowing for secure shape acquisition without being accompanied by any false pattern such as a moire even in the case of acquisition of the vessel having any irregular shape or a shape, the value shift of which is relatively great or high. Therefore, the diagnosis support apparatus 100 can help a physician to make easy and correct diagnosis.

Second Embodiment

While the first embodiment uses the dermoscopic image of the cutaneous lesion, the invention can be applied to the captured image of legions other than the cutaneous legion. The second embodiment in which the captured image of fundus is used will be hereinafter described.

Since a fundus image examination can be done conveniently at a relatively modest cost, it is widely used in a health diagnosis or a medical checkup. Fundus image examination can be done by the observation of the fundus located behind a pupil through a lens by use of a fundus camera or a fundus mirror, and is a method for examining a blood vessel, a retina, and an optic nerve of the fundus in a non-invasive manner. The fundus image examination is used for the examination of eye diseases such as a retinal detachment, a fundus hemorrhage, and a glaucoma. Moreover, since a fundus vessel is an only portion of a human body where a vessel can be directly observed, diseases of a whole body such as a hypertension, which is one of diseases of blood circulatory system, an arteriosclerosis, and a brain tumor can be speculated based on the observation of the fundus vessel. For the reasons, the fundus image examination is an effective tool for the examination of lifestyle-related diseases.

A diagnosis support apparatus 100 in accordance with the second embodiment of the invention has the same configuration as the diagnosis support apparatus 100 in accordance with the first embodiment of the invention except that the thermoscope-equipped image-capturing device 110 is replaced with a fundus camera 110.

The operation of the diagnosis support apparatus 100 in accordance with the second embodiment of the invention is basically similar to that of the diagnosis support apparatus 100 in accordance with the first embodiment of the invention, and the difference(s) between the diagnosis support apparatus 100 in accordance with the first embodiment and the diagnosis support apparatus 100 in accordance with the second embodiment will be hereinafter described with reference to FIGS. 10-12.

Figure 10:
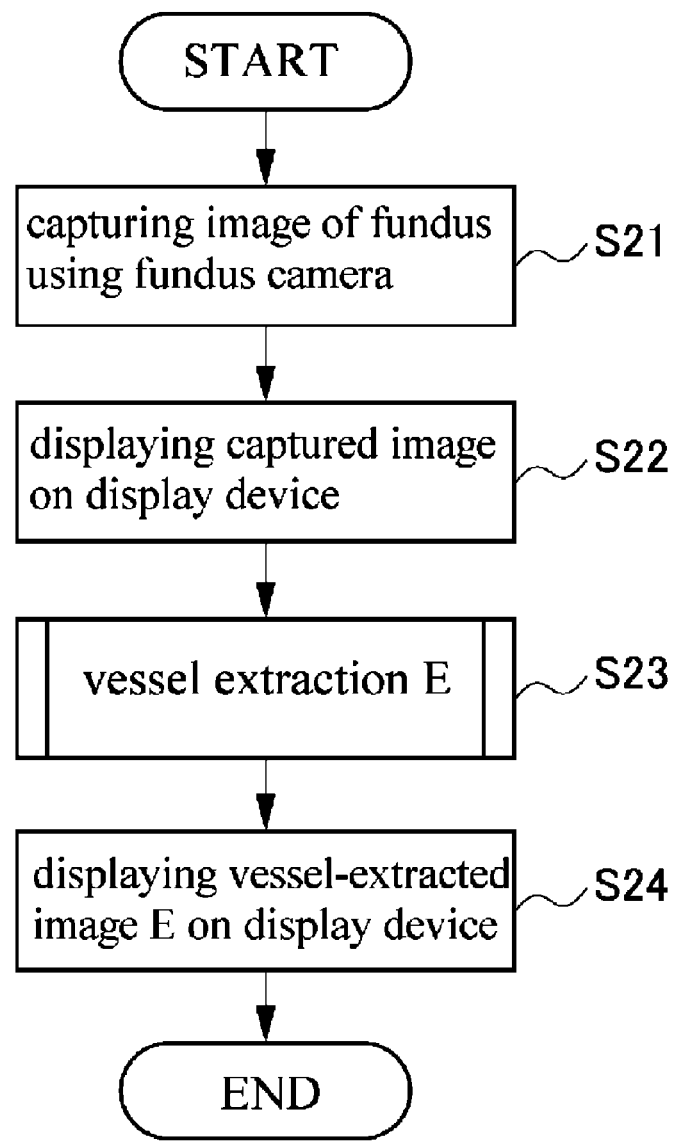
FIG. 10 is a flow chart illustrating a basic processing operation of a second embodiment of the diagnosis apparatus in accordance with the present invention.

FIG. 10, which corresponds to FIG. 2 with respect to the first embodiment, depicts the flow of basic processing operation of the diagnosis support apparatus 100 in accordance with the second embodiment of the invention. The processing unit 101 firstly acquires a fundus image I that is captured by the fundus camera 110 (Step S21). Then, the captured image I as acquired is memorized in the predetermined area of the image-memorizing unit 102, and is displayed on the display device 120 (Step S22). Subsequently, the processing unit 101 performs vessel extraction E processing on the captured image I (Step S23) and highlighting processing on the extracted vessel as thus obtained. The highlighting-processed image as thus obtained and the captured image I as previously displayed are displayed in parallel on the display device 120. Diagnosis is left to a physician (Step S24).

In the captured image I of the fundus, the reflective strength of the vessel is weaker than the surrounding, and the value thereof is relatively low. While the fundus camera 110 generally provides a monochromic image, such monochromic image (i.e., a brightness image) may be generated by a color camera.

Figure 11:
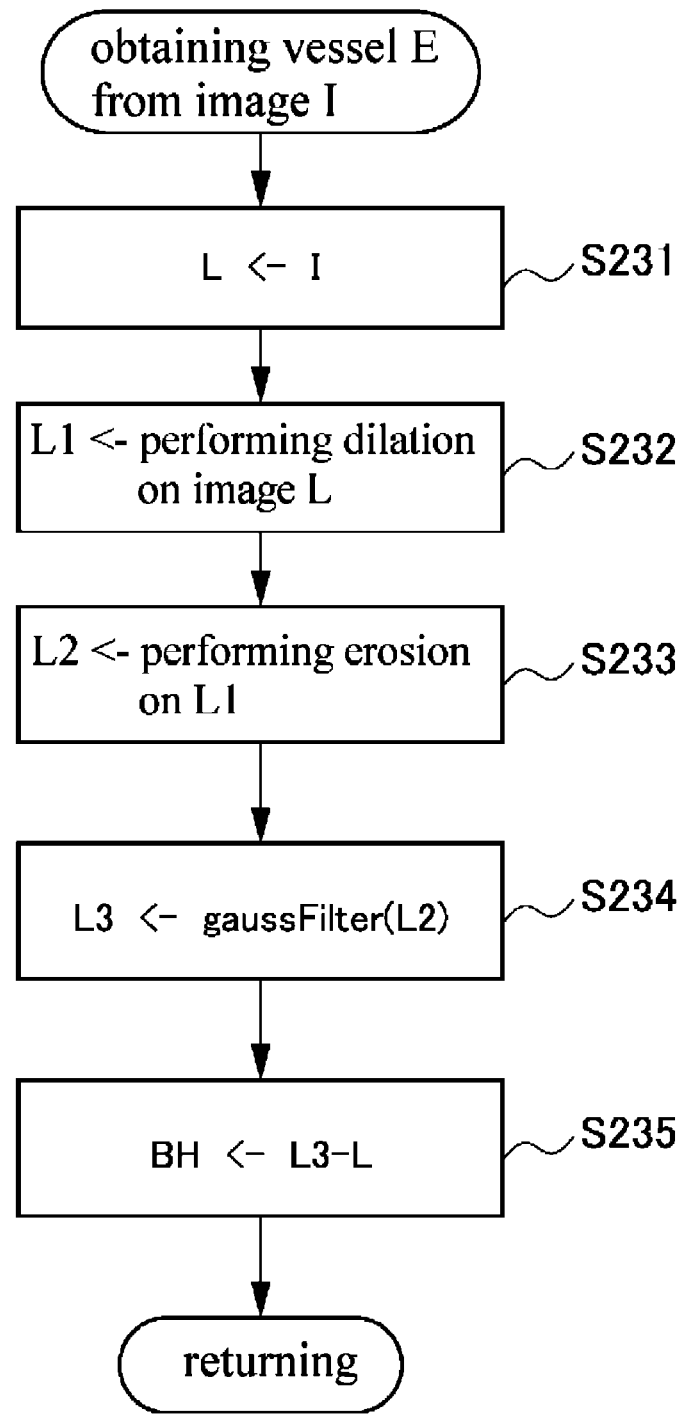
FIG. 11 is a flow chart illustrating an exemplary processing of obtaining a candidate vessel image from a brightness image in accordance with the second embodiment of the invention.

FIG. 11, which corresponds to FIG. 4 of the first embodiment, depicts the flow for obtaining the vessel-extracted image E from the captured image I. Firstly, the captured image I of the fundus is an image L (Step S231). Subsequently, the first extracting means 101b-1 perform the dilation processing on the image L to obtain a processed brightness image L1 (Step S232).

Next, the first extracting means 101b-1 perform the erosion processing on the dilation-processed brightness image L1 to obtain an erosion-processed brightness image L2 (Step S233). Subsequently, the first extracting means 101b-1 perform the smoothing filter processing on the erosion-processed brightness image L2 to obtain a smoothed brightness image L3 (Step S234). In this regard, the smoothing may be performed by Gaussian filter. The details of the Gaussian filter is described above in connection with the first embodiment. Bottom-hat processed image BH is obtained by subtracting the image L from the smoothed brightness image L3 (BH=L3−L) (Step S235).

The afore-mentioned processing is repeatedly performed predetermined times. If the afore-mentioned processing is completed, the image BH as thus obtained is a vessel-extracted image E. Under the predetermined times the image BH as the image L is repeatedly subjected to the dilation processing (Step S232), the erosion processing (Step S233), and etc.

In the above embodiment, as shown in FIG. 11, as the value of the vessel of the captured image I is smaller than that of the surrounding, the bottom-hat processing accompanied by the smoothing filter processing can be used. To the contrary, in a case where the captured image in which the value of the vessel is greater than that of the surroundings, the top-hat processing accompanied by the smoothing filter processing can be used, as illustrated in FIG. 8 in connection with the first embodiment.

In order to obtain the captured image of the fundus, scanning laser ophthalmoscope (SLO) may be used instead of the afore-mentioned fundus camera 110. In this case, the bottom-hat processing accompanied by the smoothing filter processing may be preferably used.

Figure 12:
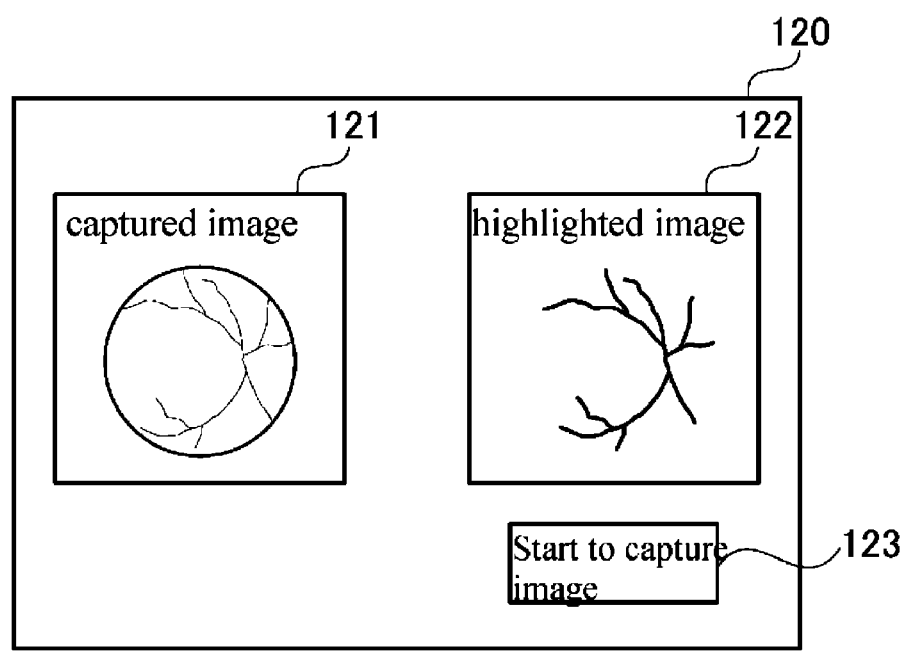
FIG. 12 shows an exemplary display screen configuration of the second embodiment of the diagnosis support apparatus in accordance with the invention.

FIG. 12 shows an exemplary display screen configuration of a diagnosis support apparatus 120 in accordance with the second embodiment. In the screen of FIG. 12, a captured image-displaying section 121 in which the captured image is shown is arranged at a left side, and a highlighted image-displaying section 122 in which the highlighted image of the vessel is shown is arranged at a right side. Due to the processing unit 101's vessel extraction processing, the captured image and the highlighted image in which the extracted vessel is highlighted out of the captured image are respectively displayed in parallel in the captured image-displaying section 121 and the highlighted image-displaying section 122 of the display device 120. This configuration is the same as the first embodiment except that the image of the affected area is captured by the fundus camera 110.

Third Embodiment

In a third embodiment, the processing unit 101 is further provided with clarifying means 101c. While the third embodiment may be applied to both of the first embodiment and the second embodiment, an example of applying the clarifying means to the first embodiment will be hereinafter described. The basic processing operation of the processing unit 101 of the diagnosis support apparatus 100 will be described with reference to the flowchart of FIG. 13

Figure 13:
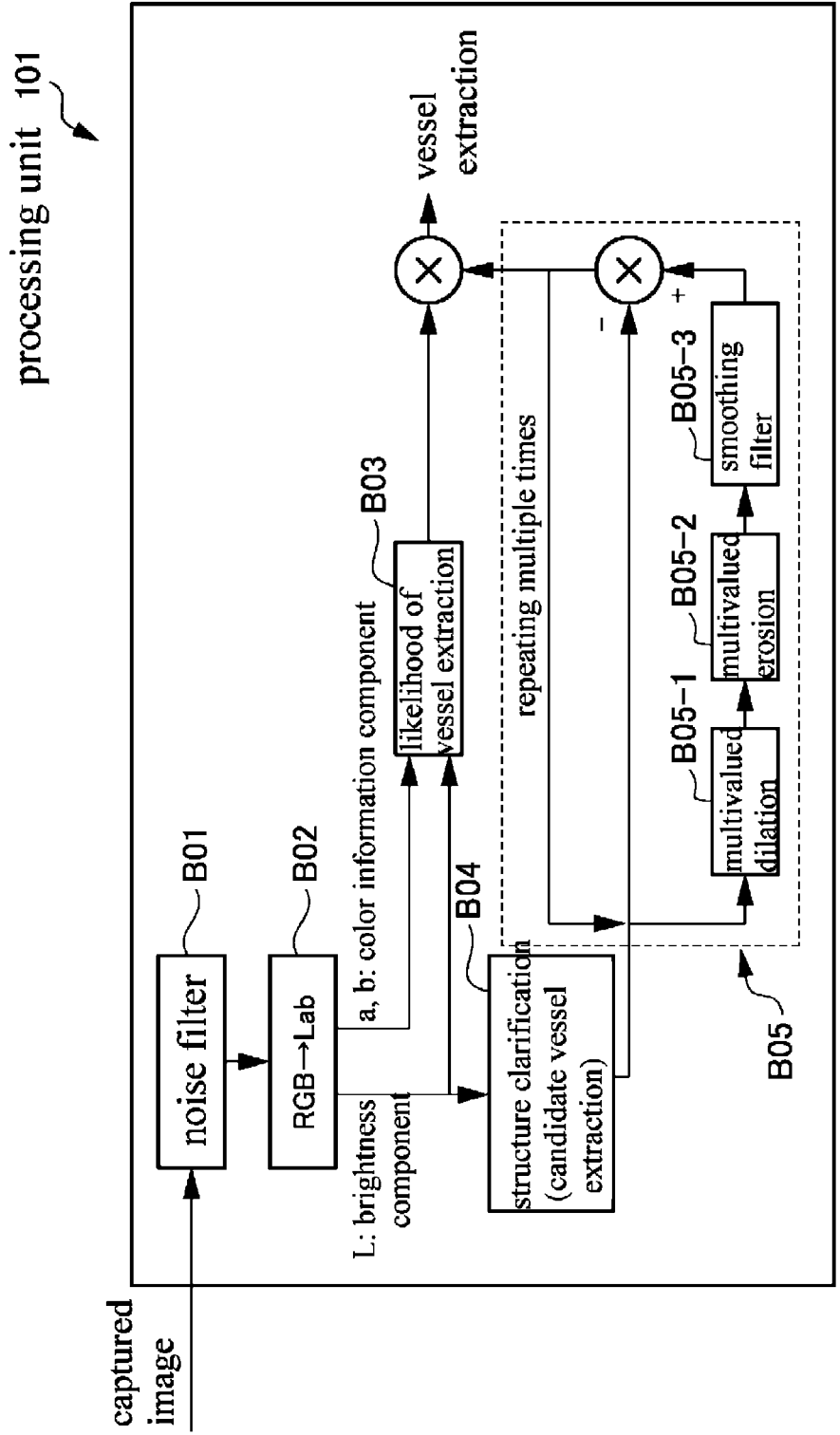
FIG. 13 is a flow chart illustrating a basic processing operation of a third embodiment of the diagnosis apparatus in accordance with the present invention.

The clarifying means 101c as shown in FIG. 13 function as a means of performing clarification processing on a brightness component using high dynamic range imaging (HDR).

While the shape of the vessel can be clearly and sharply extracted by the candidate vessel-extracting processing based on the morphology processing using the afore-mentioned bottom-hat processing or top-hat processing, false patterns such as a moire may occur when the extraction of an irregular vessel or a faint (blur) vessel which only slightly appears. In view of the above, in this embodiment, in order to extract the vessel appearing as only slight change in the captured image, the clarification processing is followed by the processing such as the afore-mentioned morphology processing. In this regard, the clarification processing is defined by a processing that subtle change is marked while obtaining the same effect as achieved by HDR. In other words, the vessel which is only slightly recognized in the image is bulged in a predetermined amount, and is then subjected to the processing such as the morphology processing. As a result, the vessel can be clearly and sharply extracted.

High dynamic range imaging (HDR) is a sort of photograph techniques for expressing a wider dynamic range compared to conventional photography. In a normal photographing, the dynamic range is narrower than a human eye. That is, even in a case where the same object as is visible to the human eye is photographed, the object cannot be recorded in the same manner as is visible to the human eye. Since the dynamic range is narrow, the contrast is significantly reduced in either or both of a bright place and a dark place, and the image with the significantly reduced contrast is recorded. As the contrast is reduced, the change is hard or hardly to recognize. In view of the above, HDR is a technology that three shots are taken under three different exposures including, for example, an exposure tailored to bright place, another exposure tailored to middle-grade bright place, and a still another exposure tailored to a dark place, and combined with each other, thereby widening the dynamic range. The image thus obtained is recorded. Due to HDR the capture image can be recorded on the impression that is close to the human eye.

Referring to FIG. 13, the processing unit 101 performs a noise-filter processing on a captured image (i.e., a dermoscopic image) to be diagnosed (Block B01), and then converts the captured image from RGB color space that is a color space of the original image to Lab color space (Block B02). Next, the processing unit 101 separates the Lab color space into a brightness component L, and color information components a and b; extracts the brightness component, or the color information component of a selected region; combines the extracted image with a HDR-processed image, which will be described below, to generate a vessel-highlighted image, which is displayed on the display device 120, as shown in, for example, FIG. 9.

The clarifying means 101c of the processing unit 101 perform the clarification processing based on HDR using the image L which corresponds to the brightness component in the Lab color space (Block B04: structure clarification), and perform the morphology processing on the clarification-processed image L to extract the shape of the vessel (Block B05). At the same time, the morphology processing is also performed on the color information components a and b to extract an image of likelihood of vessel (Block B03: extraction of likelihood of vessel).

The processing unit 101 performs the morphology processing on the opening-processed image of the likelihood of vessel having undergone the smoothing filter processing, as well as, an image that is obtained by subtracting the brightness image from the closing-processed image of the brightness component having undergone the smoothing filter processing (Block B05-3). In this regard, the opening processing is defined by a processing in which the erosion and the dilation are performed once or multiple times in this order, and the closing processing is defined by a processing in which the dilation (B05-1: multivalued dilation) and the erosion (B05-2: multivalued erosion) are performed once or multiple times in this order, as shown in FIG. 13. The smoothing filter which can be employed in the embodiment may be a Gaussian filter, as mentioned previously.

The clarification processing is performed on one piece of image, and HDR image is also obtained from one piece of captured image. A method of obtaining HDR image from one piece of image includes the steps of obtaining a base component image using by means of a component separation filter composed of an edge preserving smoothing filter; and attenuating the base component image to obtain reconstructed image. During the candidate vessel extraction processing as shown in FIG. 4 (i.e., generating the candidate vessel BH from the image L) the image L can be subjected to the clarification processing to obtain LHDR image, the flow of which is provided in FIG. 14.

Figure 14:
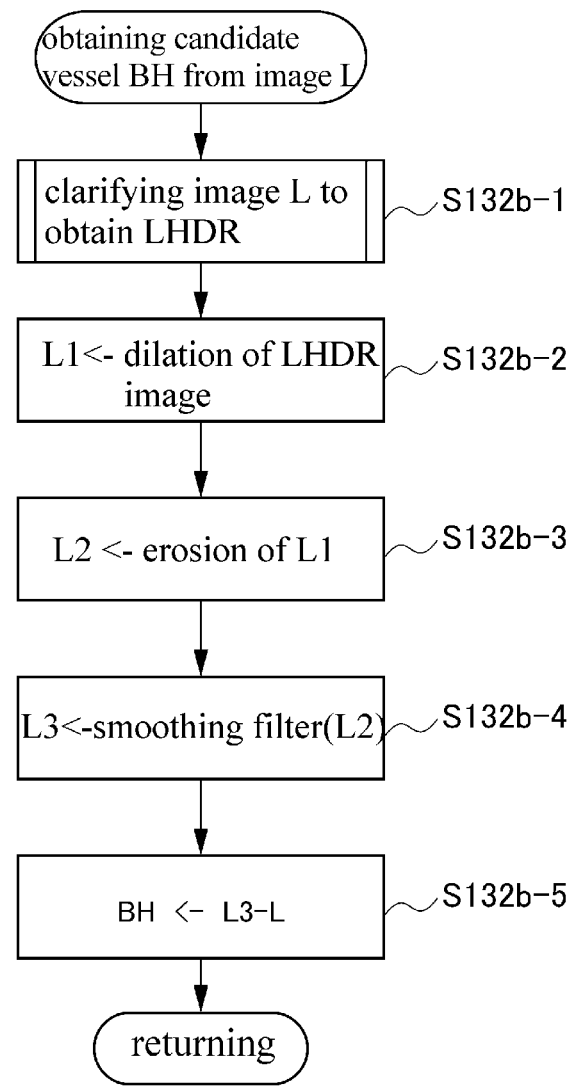
FIG. 14 is a flow chart illustrating an exemplary processing of obtaining a candidate vessel image from a brightness image in accordance with the third embodiment of the invention.

Referring to FIG. 14, the processing (Step S132b-2-S143b-5) other than the processing of generating LHDR image (Step S132b-1) as the first step is the same as the processing of generating the candidate vessel BH from the image L based on the bottom-hat processing (Steps S132-1-S132a-4) as shown in FIG. 4. Accordingly, unnecessary overlapping description is omitted. The clarification processing for obtaining LHDR image as shown in Step S132b-1 is performed by the processing unit 101 (a first processing module) as shown in FIG. 1, and the first processing module has clarifying a means of performing the clarification processing on the original image. The flow of the clarification processing performed by the clarifying means 101c will be hereinafter described with reference to the flow chart of FIG. 15.

Figure 15:
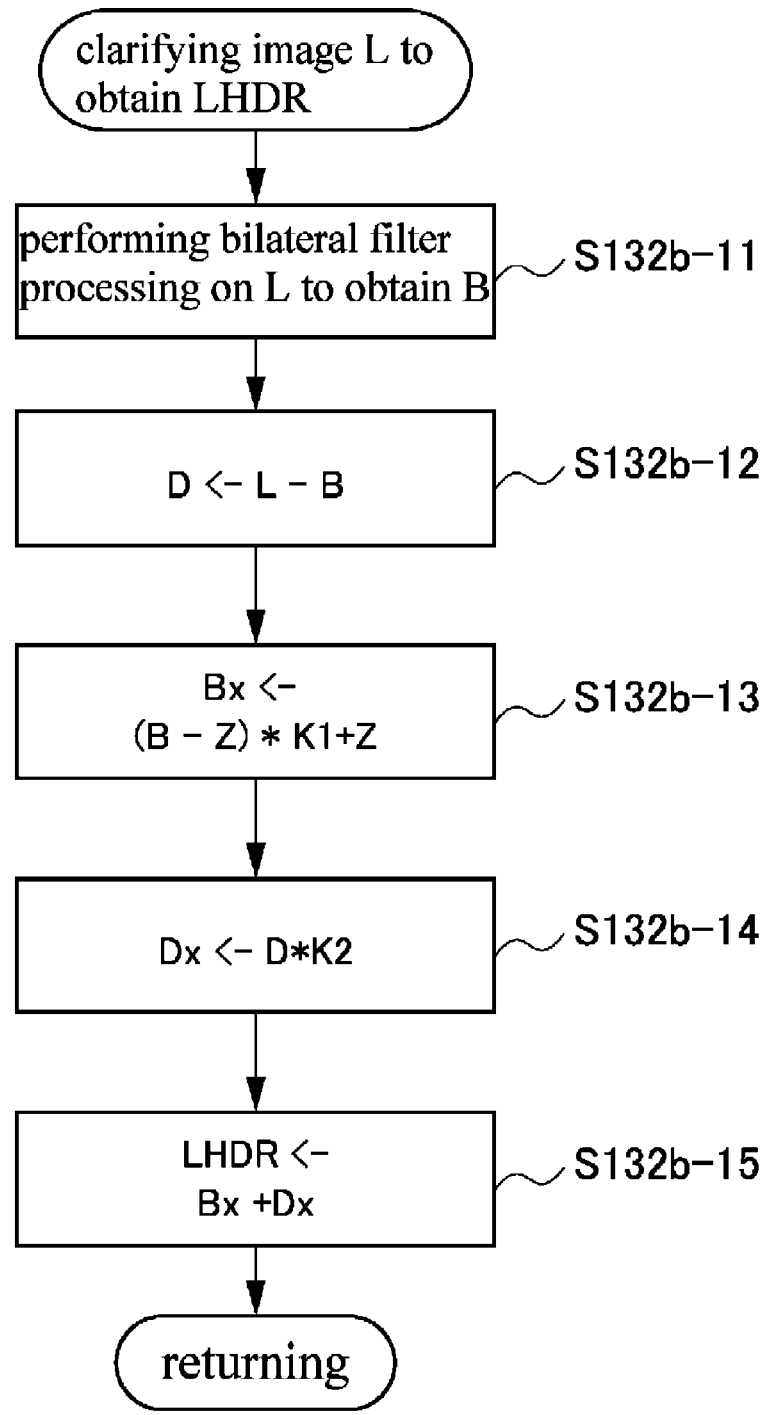
FIG. 15 is a flow chart illustrating an exemplary processing of clarifying the brightness image of FIG. 14 to obtain HDR image.

Referring to FIG. 15, the clarifying means 101c firstly perform the filtering processing on the image L to obtain a base component image (image B) (Step S132b-11). During the filtering processing a component separation filter composed of a bilateral filter which is an edge preserving smoothing filter is used. Subsequently, the clarifying means 101c subtract the image B from the image L to obtain the detail component image (image D) (Step S132b-12). Next, an offset Z is subtracted from the image B and the result as thus obtained is amplified by a coefficient K1 to obtain an image Bx (Step S132b-13). In this regard, the effect of HDR can be attained on a condition of K1<1. Subsequently, due to the clarifying means 101c the image D is amplified by a coefficient K2 to obtain an image Dx, and the image D is amplified to highlight subtle change of the shape on the proviso that K2 is 1 or above (Step S132b-14).

The clarifying means 101c finally add the image B to the image Dx to obtain LHDR image, and deliver the LHDR image to the first extracting means 101b-1 (Step S132-15). The first extracting means 101b-1 having received the LHDR image performs the vessel extraction processing on the LHDR image based on the bottom-hat morphology processing, as described above and provided in Step S132a-1-S132a-4 of FIG. 4 and Step S132b-2-S132b-5 of FIG. 14.

As mentioned previously, in accordance with the third embodiment, the processing unit 101 (the first processing module) performs the clarification processing on the original image, and then performs the candidate vessel extraction processing on the resulting image based on the morphology processing, thereby allowing for secure acquisition of the vessel appearing as only slight change in the captured image, without being accompanied by any false pattern even in the case of acquisition of the vessel having any irregular shape or a shape, the value shift of which is relatively great or high. Therefore, the shape of the vessel can be clearly and sharply extracted.

Moreover, the clarification processing as shown in FIG. 15 is only non-restrictive example. As the clarification processing which can be used in this embodiment, a clarification method including the steps of separating a brightness component into a base component and a detail component using the component separation filter, and performing contrast-highlighting processing on the base component brightly, as described in Japanese Patent Application No. 2014-227528 and a method for clarifying an original image by combining the processed results processed by two component separation filters having properties different from each other, as described in Japanese Patent Application No. 2015-054328 may be considered. These belong to clarification using the brightness image L. These two patent applications have been filed by the same applicant. Furthermore, a method for clarifying the original image including performing highlighting process in consideration of the likelihood of vessel of the detail component, as described in Japanese Patent Application No. 2014-227530 may be considered. This belongs to the clarification using color information as well as the brightness L. Accordingly, the afore-mentioned clarifications alone or in combination may be performed in the embodiment.

Effect of Embodiment

As described previously, according to the diagnosis support apparatus 100 in accordance with the first embodiment of the invention, the first extracting means 101b-1 of the processing unit 101, based on the brightness component and the color information component of the captured image separated by the separating means 101a, extract the candidate region using the first morphology processing based on the brightness component (FIG. 3), and the second extracting means 101b-2 of the processing unit 101 extract the likelihood of the region from the color space composed of the brightness component and the color information component and perform the second morphology processing (FIG. 7) to generate a region-extracted image, which is displayed on the display device 120. In this case, since the morphology processing including the smoothing filter processing is performed on the extracted candidate region and likelihood of the region (FIGS. 4 and 7), the shape can be securely acquired without being accompanied by any false pattern even in the case of acquisition of any irregular shape or a shape, the value shift of which is relatively great or high. For the reasons, the physician can visually check a screen on which the region to be diagnosed is highlighted, thereby causing the physician to make an easy and correct diagnosis. As a result, diagnostic accuracy is improved. The same logic can be applied to the diagnosis support apparatus 100 in accordance with the second embodiment. In the case of the diagnosis support apparatus 100 in accordance with the third embodiment, HDR is performed on the brightness component by the clarifying means 101c prior to the morphology processing, thereby allowing for a further highlighted image for diagnosis.

The above embodiments and operational examples are given to illustrate the scope and spirit of the instant invention. These embodiments and operational examples will make apparent, to those skilled in the art, other embodiments and examples. These other embodiments and examples are within the contemplation of the present invention. Therefore, the instant invention should be limited only by the appended claims.

100 . . . diagnosis support apparatus; 101 . . . processing unit; 101a . . . separating means; 101b . . . extracting means (101b-1 first extracting means; 101b-2 second extracting means); 101c . . . clarifying means; 110 . . . dermoscope-equipped, image-capturing device; 120 . . . display device; 121 . . . captured image-displaying section; 122 . . . highlighted image-displaying section; 130 . . . input device

The invention claimed is:

1. A diagnosis support apparatus for diagnosing a lesion based on a captured image of an affected area, the apparatus comprising:
a dermoscope-equipped image capturing device which captures the captured image;
a storage which stores the captured image;
a display which displays the captured image stored in the storage; and
a processor which, under control of a program stored in a memory, processes the captured image stored in the storage,
wherein the processor, under control of the program stored in the memory, performs:
separation processing of separating the captured image into a brightness component and a color information component;
extraction processing of extracting a region to be diagnosed, the extracting processing comprising at least a first extraction processing of extracting a candidate region based on the brightness and a second extraction processing of extracting a likelihood of a region based on the color information component, and performing a morphology processing comprising a smoothing filter processing on an extracted candidate region or an extracted likelihood of the region; and
wherein the display further displays the captured image having been processed by the processor.

2. The diagnosis support apparatus according to claim 1, wherein:
when extracting a shape indicating the candidate region or the likelihood of the region in a structuring element of the captured image, the first extraction processing performs a first morphology processing on the brightness component to extract the candidate region;
the second extraction processing extracts the likelihood of the region based on the color information component; and
the extraction processing combines the extracted candidate region with the extracted likelihood of the region to generate a region-extracted image.

3. The diagnosis support apparatus according to claim 2, wherein the first morphology processing comprises:
a closing processing where a dilation and an erosion are repeatedly performed on an extracted brightness component in this order;
a smoothing filter processing performed on a closing-processed brightness component; and
a subtraction processing where the brightness component of the captured image is subtracted from a smoothing filter-processed brightness component.

4. The diagnosis support apparatus according to claim 1, wherein:
when extracting a shape indicating the candidate region or the likelihood of the region in structuring element of the captured image, the second extraction processing extracts the likelihood of the region based on the color information component; and
the extraction processing performs a second morphology processing on an extracted likelihood of the region to generate a region-extracted image.

5. The diagnosis support apparatus according to claim 4, wherein the second morphology processing comprises:
an opening processing where an erosion and a dilation are repeatedly performed on the extracted likelihood of the region in this order;
a smoothing filter processing performed on the an opening-processed likelihood of the region; and
a subtraction processing where a smoothing filter-processed likelihood of the region is subtracted from the extracted likelihood of the region.

6. The diagnosis support apparatus according to claim 1, wherein the processor, under control of the program stored in the memory, further performs clarification processing to the brightness component, the clarification processing at least increasing a visible size of an object in the brightness component, and
wherein the first extraction processing extracts the candidate region based on the brightness component having been subject to the clarification processing.

7. The diagnosis support apparatus according to claim 6, wherein the clarification processing is performed based on HDR.

8. A method of processing an image by a diagnosis support apparatus for diagnosing a lesion using a captured image of an affected area to be diagnosed, the method being performed by a processor of the diagnosis support apparatus under control of a stored program, the diagnosis support apparatus including a dermoscope-equipped image capturing device which captures the captured image, a storage which stores the captured image, and a display which displays the captured image stored in the storage, and the method comprising:
separating the captured image into a brightness component and a color information component;
extracting a region to be diagnosed based on the brightness component and the color information component, wherein when acquiring a shape having a high value in the captured image, the extracting extracts a candidate region based on the brightness component, and when acquiring a shape having a low value in the captured image, the extracting extracts a likelihood of the region based on the color information component;
performing a morphology processing comprising a smoothing filter processing on an extracted candidate region or an extracted likelihood of the region; and
further displaying, on the display, the captured image having been processed.

9. A non-transitory computer readable medium having a program stored thereon, the program being executable by a processor of a diagnosis support apparatus for diagnosing a disease using a captured image of an affected area, the diagnosis support apparatus including a dermoscope-equipped image capturing device which captures the captured image, a storage which stores the captured image, and a display which displays the captured image stored in the storage, and the program being executable by the processor to perform:

separating the captured image into a brightness component and a color information component;

extracting a region to be diagnosed based on the brightness component and the color information component, wherein when acquiring a shape having a high value in the captured image, the extracting extracts a candidate region based on the brightness component, and when acquiring a shape having a low value in the captured image, the extracting extracts a likelihood of the region based on the color information component;

performing a morphology processing comprising a smoothing filter processing on an extracted candidate region or an extracted likelihood of the region; and further displaying, on the display, the captured image having been processed.

* * * * *